July 5, 1932. C. A. HACH 1,866,102
APPARATUS FOR SHAPING SAW TEETH
Filed April 18, 1928
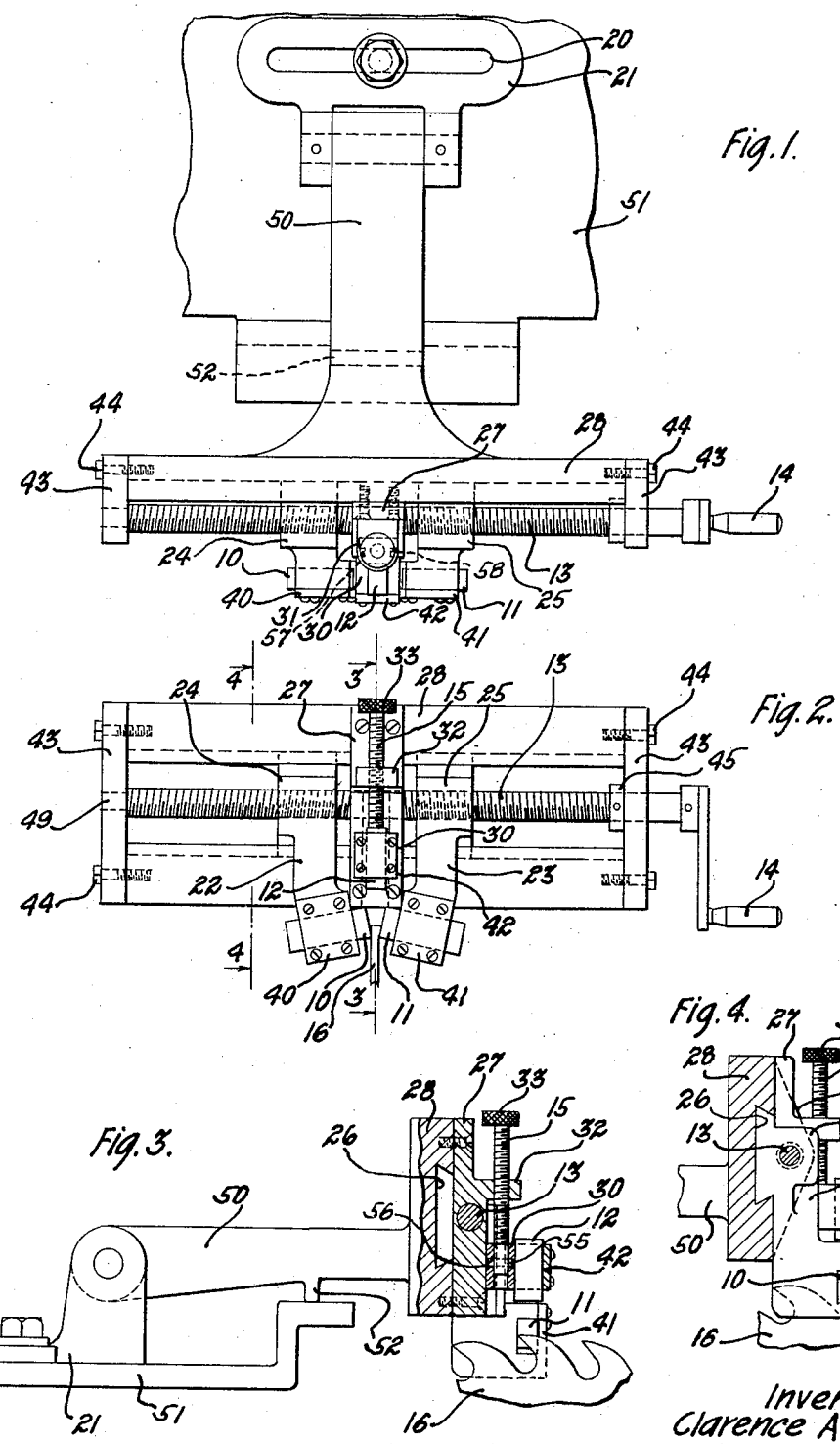
Inventor
Clarence A. Hach
by [signature] Att'y.

Patented July 5, 1932

1,866,102

UNITED STATES PATENT OFFICE

CLARENCE ALBERT HACH, OF OAK PARK, ILLINOIS, ASSIGNOR TO WESTERN ELECTRIC COMPANY, INCORPORATED, OF NEW YORK, N. Y., A CORPORATION OF NEW YORK

APPARATUS FOR SHAPING SAW TEETH

Application filed April 18, 1928. Serial No. 270,863.

This invention relates to apparatus for shaping saw teeth, and more particularly to a method of and an apparatus for dressing and jointing circular rip saws.

Experience has taught that in the art of sawing wood the cut produced by a circular rip saw is in some instances rough and uneven, and in the event that a smooth edge is desired on the wood it has been necessary to plane or joint the wood subsequent to a cut made by a circular rip saw. This jointing or planing operation has been especially necessitated where the sawed pieces of wood are to be glued together, in which case their edges must be smooth so as to produce a neatly fitting and strong joint. The importance of glued joints lies in the fact that in many instances a properly glued joint between smooth edges is stronger than a mortise joint made by dovetailing or similar construction.

The object of this invention is to provide an apparatus for dressing and jointing the teeth of a saw in such a way that the teeth are so shaped that when the saw is operated it will cut a smooth even edge and no subsequent jointing or planing of the wood will be required.

In accordance with the general features of the invention there is provided an apparatus for shaping the sides and tops of the teeth while the saw is in operating position and while it is running at its normal operating speed. The apparatus for dressing the saw consists generally of a pair of abrasive members connected to a screw having a right and a left hand thread and actuated by a handle for simultaneously bringing the abrasive members in contact with the sides of the teeth, and of an abrasive member adjustable by a screw for engaging the tops of the teeth. The aforementioned abrasive members are mounted on a cross piece which is attached to the end of an arm that is pivoted to a base which may be adjustably secured to the frame of any ordinary sawing machine. Such pivoted construction provides for swinging the dressing apparatus in the clear when the saw is in use.

A clear understanding of the invention may be had from the following detailed description of one embodiment thereof as illustrated in the accompanying drawing showing an apparatus embodying features of the invention and which may be used in practicing the method, wherein Fig. 1 is a plan view of the dressing apparatus, showing the apparatus attached to any ordinary sawing machine frame;

Fig. 2 is a front view of the apparatus, showing the lateral abrasive members thereof in contact with a circular rip saw;

Fig. 3 is an elevational view taken on the line 3—3 of Fig. 2, showing in cross-section the structure for adjusting the top abrasive member, and Fig. 4 is an elevational view taken on line 4—4 of Fig. 2, showing the structure for supporting and adjusting the lateral abrasive members.

Referring now to the drawing in detail in which like numerals designate like parts throughout the several views, there are disclosed three abrasive members, which may be files, or may consist of carborundum or some similar abrasive substance, for shaping the sides and tops of the teeth of a circular rip saw, comprising two lateral members 10 and 11 and a top member 12. The members for supporting and adjusting these members are rigidly constructed and secured in order to firmly hold the members in contact with a saw while the saw is moving at its normal operating speed in position in the sawing machine insuring a uniform abrasion to obtain a symmetrical contour of the saw with respect to its plane of movement. It is known that on account of stresses set up due to rapid motion a moving saw may assume a slightly different shape from a saw that is not moved at any appreciable speed, and thus for satisfactory results it is considered best to dress and joint the saw while the saw is running at its operating speed. That the speed at which some saws operate is considerable is evidenced by the fact that some circular saws are frequently operated at 3600 R. P. M., which in the case of a saw 14 inches in diameter amounts to a peripheral speed of over two miles per minute.

A double threaded screw 13, having a right and a left hand thread and a crank 14, is provided for laterally adjusting the abrasive members 10 and 11 to bring them simultaneously into contact with a circular rip saw 16, and a vertical adjusting screw 15 is provided for bringing the top abrasive member 12 into engagement with the tops of the teeth. For providing lateral adjustment of the abrasive members to bring the top abrasive member 12 within the plane of the saw and permit correct adjustment of the abrasive members 10 and 11, a slot 20 is provided in a base 21 which supports all the aforementioned abrasive members and which is connected to a frame 51 of an ordinary sawing machine.

Arms 22 and 23 support the abrasive members 10 and 11, and these arms are adjustably connected to the screw 13 which engages threaded apertures in the arms. Enlarged portions 24 and 25 of the upper ends of the arms 22 and 23, respectively, are provided with flanges which fit within a trapezoidal groove 26 in the face of a cross-piece 28, this construction providing a rigid means for supporting the arms. The structure for supporting and adjusting the top abrasive member 12 consists of a guide member 27 secured to the cross-piece 28, a support 30 movable within the guide number 27, and the adjusting screw 15 for actuating the support. The adjusting screw 15 is adapted to actuate the support 30 by being threaded within a projection 32 integral with the guide member 27 and by having a pin 55 which rotates within an opening 56 in the support 30. A knurled head 33 is provided at the upper end of the screw 15 for hand operation. The slidable mounting of the support 30 within the guide member 27 comprises a pair of flanges 57 and 58 (Fig. 1) extending from the guide member 27 and fitting within corresponding grooves in the support 30.

The top and lateral abrasive members 10, 11 and 12, fit within grooves in their respective supports 22, 23 and 30, which grooves are of substantially the same size as the abrasive members in order to provide a snug fit therefor. The abrasive members are held in these grooves by plates 40, 41 and 42 secured to the supports by screws, and this construction is designed with the aforementioned idea of rigid construction to secure the abrasive members firmly in position and prevent any possibility of their becoming loose when in contact with a rapidly moving saw. End members 43—43 secured to the ends of the cross-piece 28 by bolts 44 retain the double threaded screw 13 in operative position. The screw 13 is held within apertures in the end members 43—43 by means of a collar 45, pinned to the screw which retains a reduced end 49 of the screw within the end member at the other end of the screw.

The cross piece 28 is supported by an arm 50 pivoted to the base 21, and the base 21, as before stated, is adjustably secured to the frame of a sawing machine 51. The frame 51 may be of any usual and suitable type adapted for suitably supporting and operating the rotating saw of a sawing machine for producing edges suitable for gluing, the details of the machine being omitted since they are not essential to a clear understanding of the invention. The arm 50 is provided with a tip 52 for resting the weight of the dressing apparatus on the sewing machine frame.

The operation of the apparatus proceeds as follows: The dressing apparatus is manually swung on the arm 50 into operative position adjacent the saw 16 while the saw is stationary. The crank 14 is actuated to rotate the double threaded screw 13 to simultaneously move the arms 22 and 23 and the abrasive members 10 and 11 respectively held thereby into proximity of the saw 16, when the saw is actuated at operating speed. The double threaded screw 13 is actuated further to move the abrasive members 10 and 11 simultaneously into engagement with the sides of the teeth, and the screw 15 is actuated by the knurled head 33 to move the support 30 and the top abrasive member 12 held thereby into contact with the tops of the teeth. The lateral and top abrasive members are then left in contact with the saw while the saw is rotated at normal operating speed and until the teeth are properly dressed and jointed.

It is to be remembered that the above described apparatus is designed for rigidly and firmly holding abrasive members in contact with a saw while the saw moves at its operating speed, and although such apparatus is here shown applied to a circular saw with swaged teeth it may just as readily be applied to set or to straight teeth, and may be used in connection with any sawing machine to which it can be attached. The advantage of dressing and jointing a saw while the saw is moving at its operating speed and in its operating position within its supporting frame is that the operation is performed on the true cutting edge of the saw, and the saw so operated upon makes a smooth cut and obviates the necessity of a subsequent jointing operation being performed on the sawed edges of the wood.

The above description in connection with the accompanying drawing presents one embodiment of an invention for efficiently shaping saw teeth at operating speeds. It is of course to be understood that the invention is not to be limited to this one embodiment but is susceptible of various modifications without departing from the scope of the appended claim.

What is claimed is:

In an apparatus for shaping saw teeth, a supporting member pivoted to a fixed support adjacent the saw and having a portion movable in the plane of the saw into and out of operative relation to the saw, a jointing member carried by the supporting member and adjustable radially with respect to the saw, a pair of supports movable laterally of the saw, dressing members carried by said supports, and adjusting means operative to move the supports simultaneously toward or away from each other.

In witness whereof, I hereunto subscribe my name this 7th day of April, A. D. 1928.

CLARENCE ALBERT HACH.